UNITED STATES PATENT OFFICE.

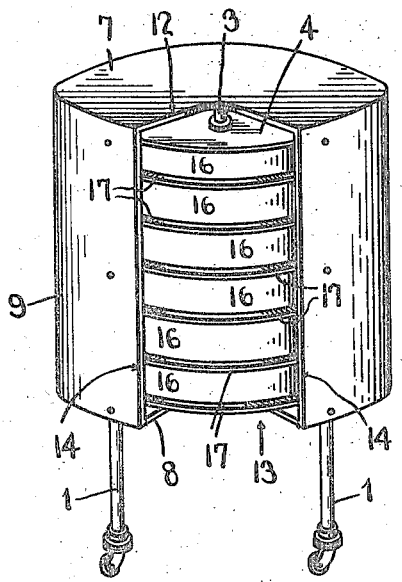
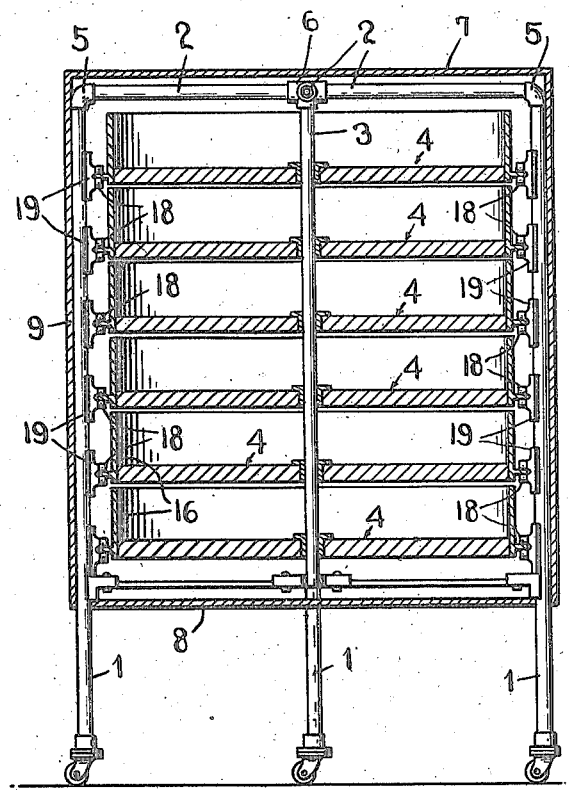
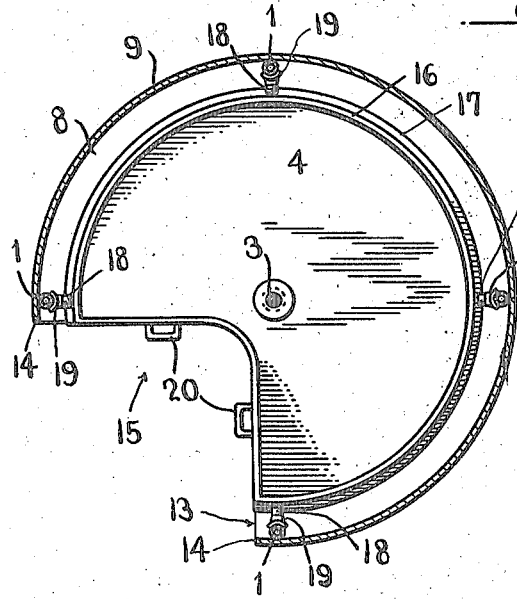
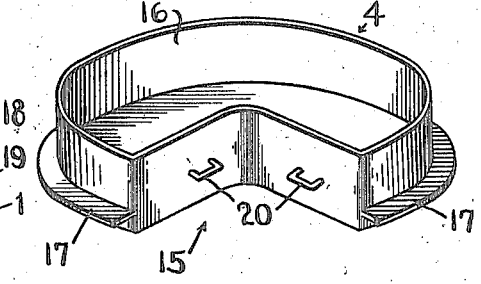

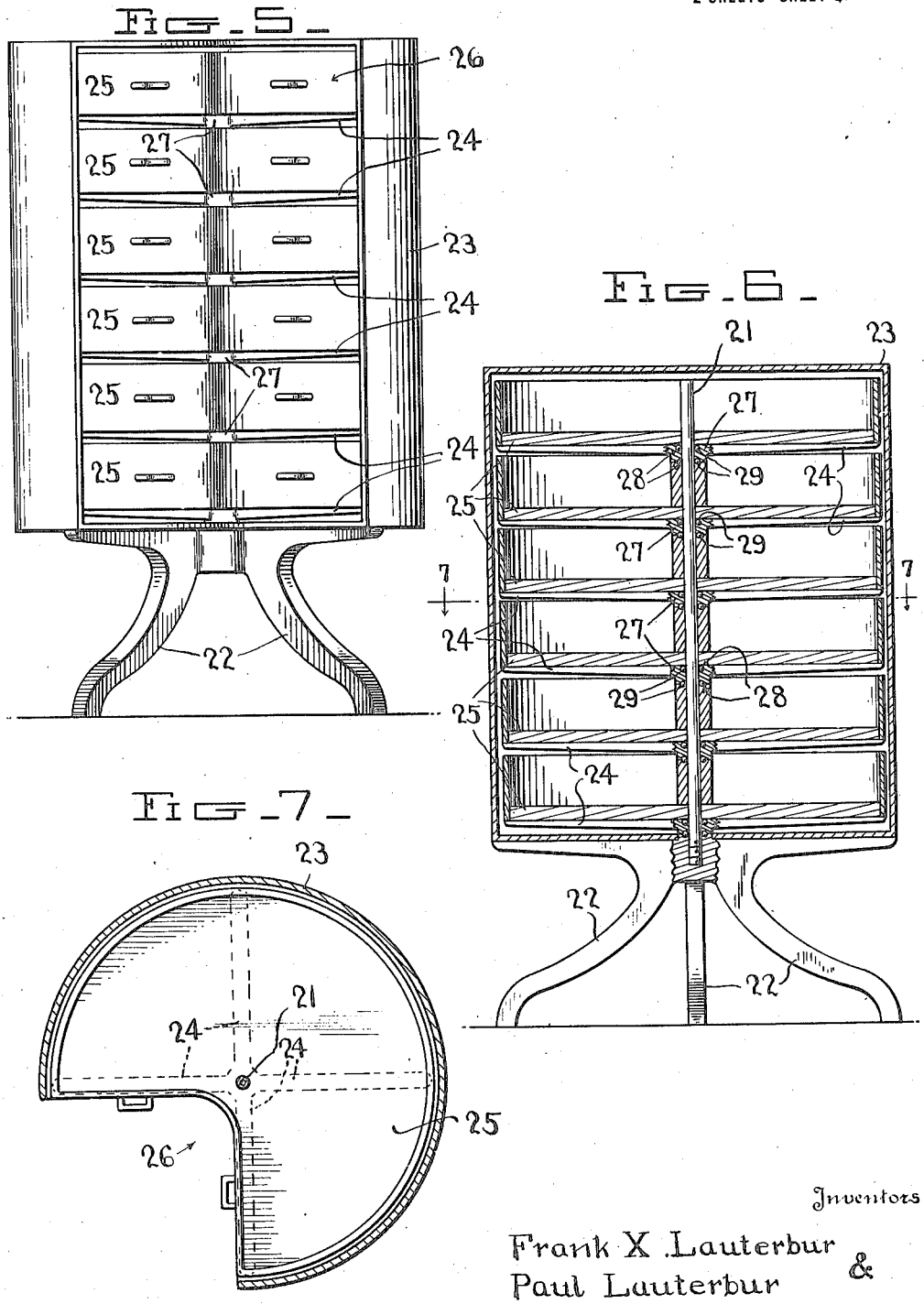

FRANK X. LAUTERBUR AND PAUL LAUTERBUR, OF SIDNEY, OHIO.

ROTARY DOUGH-PROOFING DEVICE.

1,248,682.  Specification of Letters Patent.  Patented Dec. 4, 1917.

Application filed March 11, 1916. Serial No. 83,506.

*To all whom it may concern:*

Be it known that we, FRANK X. LAUTERBUR and PAUL LAUTERBUR, citizens of the United States, residing at Sidney, in the county of Shelby and State of Ohio, have invented certain new and useful Improvements in Rotary Dough-Proofing Devices, of which the following is a specification.

The invention relates to a rotary dough-proofing device.

The object of the present invention is to provide a simple practical and efficient dough proofing device of strong, durable and inexpensive construction designed principally for use in comparatively small baking establishments and adapted to save time and labor in the handling of the lumps of dough in proofing the same and equipped with a plurality of easily accessible dough receiving trays arranged at a convenient height for the workman and capable of being rapidly and successively filled and similarly emptied at the completion of the proofing process without any unnecessary handling of the trays and without requiring excessive stooping on the part of the workman.

A further object of the invention is to provide a thoroughly sanitary dough proofing device adapted to contain a sufficient number of dough receiving trays to permit sufficient time to elapse in the successive filling of the trays for the carrying out of the proofing process of the dough of the tray first filled by the time the last tray of the series has received its contents, and capable of enabling the trays to be conveniently and expeditiously emptied in the order in which they were filled so that the work of proofing the dough may be rapidly and uninterruptedly performed without the delay of rearranging a set of trays or receptacles to permit the dough to be removed in the order in which it was placed in the trays or receptacles, as is the case in small bakeries where a set of loose trays or receptacles is employed and which are stacked one upon another as they are filled and require a restacking or rearrangement in order to obtain access to the bottom tray or receptacle which first received its contents.

It is also an object of the invention to provide a dough proofing device having a casing and a series of trays adapted to coöperate with the casing for completely closing the device to permit the dough to remain in a closed receptacle the necessary time to complete the dough proofing operation, said receptacles being adapted to be independently operated and instantly brought to a position for exposing their contents.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a perspective view of a rotary dough proofing device constructed in accordance with this invention, Fig. 2 is a vertical sectional view of the same, Fig. 3 is a horizontal sectional view of the dough proofing device, Fig. 4 is a detail perspective view of one of the trays, Fig. 5 is an elevation of a rotary dough proofing device illustrating another form of the invention, Fig. 6 is a vertical sectional view of the same, Fig. 7 is a horizontal sectional view on the line 7—7 of Fig. 6.

Like numerals of reference designate corresponding parts in all the figures of the drawings.

In the accompanying drawings in which is illustrated the preferred embodiment of the invention, the rotary dough proofing device comprises in its construction a supporting frame or stand preferably composed of four vertical legs or standards 1 connected at their upper ends by diametrically arranged top-cross bars 2, centrally connected and supporting a depending vertical pivot 3, on which are mounted a plurality of independently movable trays 4. The frame is preferably made up of tubular metal, such as ordinary gas pipe or the like, and the bars or pieces can be conveniently connected by the couplings 5 and 6. The couplings 5 are L-shaped and connect the legs or standards with the top cross-bars while the coupling 6 which is located at the center of the top of the frame or stand, preferably consist of four horizontal arms and a central depending arm to which the upper end of the central pivot is connected. Any other suitable means may however be employed for connecting the bars or members of the frame or stand.

The frame or stand supports a casing composed of a top wall 7, a bottom wall 8, and a curved side wall 9 preferably constructed of sheet metal suitably secured to the bars or members of the supporting frame or stand. The top and bottom walls 7 and 8 consist of disks having inward tapered approximately sector shaped cutaway portions or openings 12 and 13, the side edges of which preferably extend from two adjacent legs or standards to a point near the centers of the top and bottom walls of the casing. The side wall consists of a portion of a cylinder having its vertical end edges 14 located at two adjacent legs or standards and spaced apart substantially the distance between the same. By this construction a substantially cylindrical casing having an approximately sector shaped cutaway portion or opening is provided.

The trays 4 which are mounted for rotary movement on the vertical pivot consist of a disk or plate forming the bottom of the tray and provided with an inwardly tapered cutaway portion or opening 15 and having a vertical marginal wall 16 extending entirely around the tray. The cutaway portion 15 is approximately sector shaped or quadrant shaped to conform generally to the configuration of the opening in the top, bottom and side wall of the cylindrical casing and when the proofing device is closed the trays are contained within the casing and the cutaway portions of the trays are then arranged in register with the cutaway portion of the casing. The marginal walls of the trays at the cutaway portions of the latter close the casing at the opening or cutaway portion of the same and access may be had to the contents of any one of the trays by rotating the same on the vertical pivot to bring different portions of such tray at the opening of the casing.

Any number of trays may be employed to provide a dough proofing device of the desired capacity and each tray is provided at its periphery with a horizontally projecting arcuate flange 17 located at the bottom of the tray and extending between upper and lower anti-friction wheels or rollers 18 mounted in a suitable bracket 19 of approximately C-shape arranged at intervals and suitably secured to the side wall of the casing preferably at the legs or standards of the frame. The anti-friction rollers support and maintain the trays in a horizontal position and enable them to turn freely and prevent sagging of the trays when the contents are unevenly distributed. The anti-friction rollers may be mounted in various other ways and they can be located at any suitable intervals to obtain the necessary support for the rotary trays. In order to facilitate the ready adjustment or rotary movement of the trays the latter are provided at opposite sides of the recesses or cutaway portions with suitable handles 20 secured to the exterior of the marginal walls and preferably in the form of loops but any other construction of handle may, of course, be employed. In rotating the trays the handle will enable them to be conveniently turned in either direction.

In Figs. 5 to 7 inclusive of the drawing is illustrated another form of rotary dough proofing device in which a central vertical pivot 21 is supported by a frame or stand having legs 22 of a relatively wide spread to provide a broad supporting base and prevent accidental tipping or upsetting of the dough proofing device. The legs 22 which incline downwardly and outwardly are suitably connected at their upper ends. The vertical pivot which may be connected at its lower end with the legs in any desired manner coacts with the frame in supporting a casing 23 and has mounted on it rotary supporting members 24 consisting of diametrically arranged arms and secured to the lower faces of the bottoms of the trays 25. The casing 23 which is constructed in substantially the same manner as that heretofore described is composed of top, bottom and side walls and it has an inwardly tapered approximately sector or quadrant shaped opening 26. The trays 25 are also of the same construction as those heretofore described with the exception of the omission of the projecting flange as they are supported by the diametrically arranged arms of the rotary frames or spiders 24 and do not require the brackets and anti-friction rollers. The rotary frames are provided with hubs 27 having upper and lower ball races 28 in which are arranged anti-friction balls 29 which enable the trays to rotate freely and frictionlessly. The upper and lower balls resist any tendency of the trays to tilt or sag under an uneven distribution of their contents so that the trays in loading and unloading them will rotate without any binding action.

The rotary dough proofing device in both forms of the invention is adapted to lessen the labor and greatly facilitate the work of a baker in proofing dough and it is adapted also to be easily cleaned and maintained in a thoroughly sanitary condition.

What we claim is:—

1. A rotary dough proofing device including a supporting frame or stand provided with a centrally arranged pivot, a substantially cylindrical casing supported by and inclosing the upper portion of the frame or stand and provided with an inwardly tapered vertical opening or cutaway portion, and a plurality of rotary dough proofing trays mounted on the said pivot and operating within the said casing, said trays having inwardly tapered openings or recesses of approximately the size of the opening or cutaway portion of the casing and provided also with marginal walls extending entirely around the trays and entirely closing the casing at the opening or cut away portion thereof when the openings or recesses of the trays are in register with the opening or cutaway portion of the casing, said trays being independently rotatable to expose their contents at the opening or cutaway portion of the casing.

2. A rotary dough proofing device including an approximately cylindrical casing having an inwardly tapered vertically disposed cut away portion or opening extending the entire length of the casing, a plurality of independently movable dough receiving trays arranged in a vertical series within the casing and each consisting of a disk having an inwardly tapered cutaway portion or opening and provided with a marginal wall extending around the periphery of the disk and along the edges of the cutaway portion or opening so as to close the casing completely at the cutaway portion or opening thereof when the cutaway portions or openings of the trays are in register with that of the casing, and means for mounting and supporting the trays for independent rotary movement to permit them to be rotated to expose their contents at the opening or cutaway portion of the casing.

3. A rotary dough proofing device including a cylindrical casing composed of a top and bottom provided with vertically alined inwardly extending tapered openings or cutaway portions and a continuous curved vertical wall connecting the peripheral edges of the top and bottom walls and having its ends spaced apart at the said openings or cutaway portions of the said top and bottom walls, a vertical series of independently movable dough receiving trays located within the casing and each composed of a disk having a tapered opening or cutaway portion corresponding with those of the top and bottom walls, and a vertical wall extending around the peripheral edge of said disk and along the edges of the opening or cutaway portion and adapted to completely close the casing when the cutaway portions or openings of the trays are in register with that of the casing, said trays being rotatable to expose their contents at the cutaway portions or openings of the casing.

4. A rotary dough proofing device including a stand composed of vertical standards and top diametrically arranged connecting bars connected together at the center and provided with a central depending pivot, a vertical series of rotary dough receiving trays mounted on the said pivot and each consisting of a disk having an inwardly extending opening or cutaway portion and a vertical wall extending around the peripheral edge of the disk and along the edges of the opening or cutaway portion, and a casing covering the trays and supported by the said stand and provided with a vertical cutaway portion or opening adapted to be completely closed by the trays when the cutaway portions or openings of the trays are in register with that of the casing.

5. A rotary dough proofing device including a stand composed of vertical standards and top diametrically arranged connecting bars connected together with the center and provided with a central depending pivot, a vertical series of rotary dough receiving trays mounted on said pivot and each consisting of a disk having an inwardly extending opening or cutaway portion and a vertical wall extending around the peripheral edge of the disk and along the edges of the opening or cutaway portion, and a substantially cylindrical casing comprising top and bottom walls consisting of disks having inwardly extending cutaway portions or openings and a curved side wall connecting the peripheral edges of the top and bottom walls and secured to the standards, said curved wall of the casing terminating at opposite sides of the cutaway portions or openings of the said top and bottom walls to form a vertical opening when the cutaway portions or openings of the trays are in register with that of the casing.

6. A rotary dough proofing device including a stand having vertical legs and a vertical pivot, a substantially cylindrical casing supported by the stand and receiving the pivot thereof, said casing having a vertical opening or cutaway portion extending inwardly from its periphery, a vertical series of dough receiving trays arranged within the casing and mounted for independent movement on the said pivot, said trays being provided with inwardly extending cutaway portions or openings and having vertical marginal walls adapted to close completely the vertical opening or cutaway portion of the casing when the cutaway portions or openings of the trays are in register with that of the casing, arcuate flanges carried by the trays, and vertical series of upper and lower rollers mounted within the casing at spaced points upon the legs of the stand and receiving the said flanges between them.

7. A rotary dough proofing device including a stand having vertical legs and a vertical pivot, a substantially cylindrical casing supported by and fitting the stand and receiving the pivot thereof, said casing having a vertical opening or cutaway portion extending inwardly from its periphery, a vertical series of dough receiving trays arranged within the casing and mounted for independent movement on the said pivot, said trays being provided with inwardly extending cutaway portions and having vertical marginal walls, arcuate flanges carried by the trays, a vertical series of brackets secured to each of the legs at the inner face of the side walls of the casing, and upper and lower rollers arranged in pairs within the said brackets and receiving the said flanges between them.

In testimony whereof we affix our signatures in the presence of two witnesses.

FRANK X. LAUTERBUR.

Witnesses:
URBAN H. DOORLEY,
MYRA C. MINNIEAR.

PAUL LAUTERBUR.

Witnesses:
C. L. HASLUP,
HARLEY McCACHEN.